Patented Feb. 17, 1925.

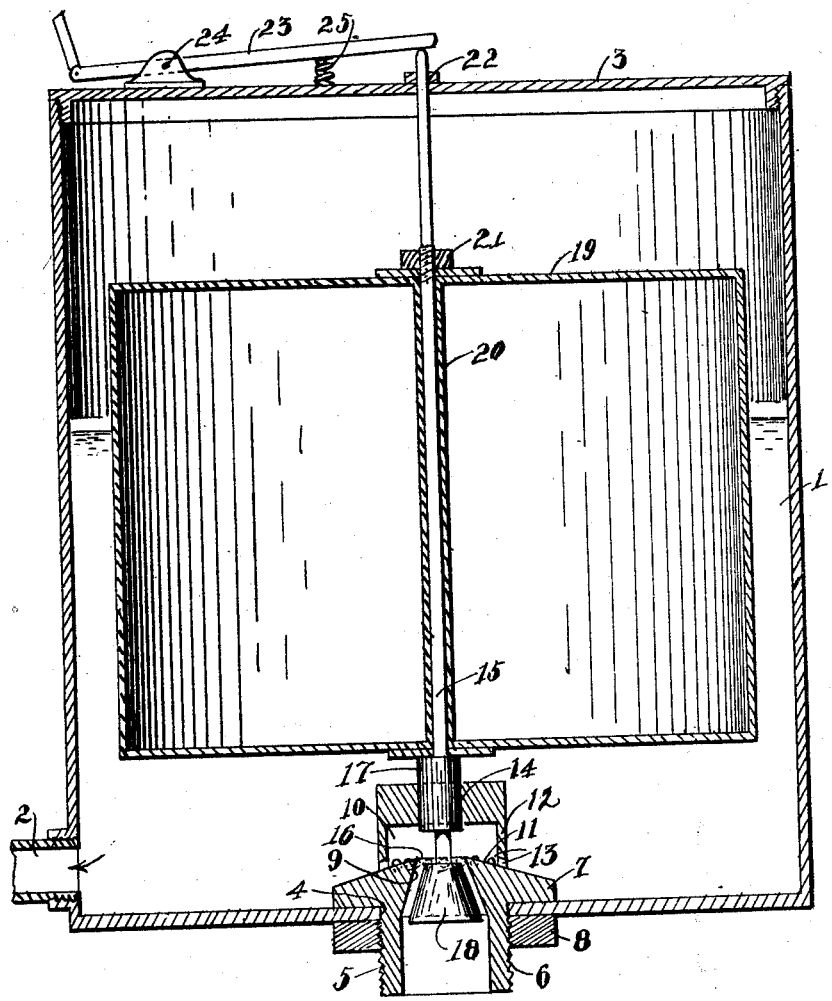

1,527,019

UNITED STATES PATENT OFFICE.

JOHN M. STONIER, OF SAN JOSE, CALIFORNIA.

FLOAT VALVE.

Application filed May 31, 1923. Serial No. 642,648.

*To all whom it may concern:*

Be it known that I, JOHN M. STONIER, a citizen of the United States, and resident of San Jose, in the county of Santa Clara and State of California, have invented certain new and useful Improvements in Float Valves, of which the following is a specification.

This invention relates particularly to a mechanism wherein a valve is operated by the movement of a float in the float chamber of a carbureter to control the flow of fuel to said chamber.

It is the object of the invention to provide a valve of the character indicated that may be readily operated from the exterior of the float chamber whereby to clean the same of obstructions that may gather between the valve and its seat, and that is provided with a seat and cage of such formation as to prevent the accumulation of sediment therein.

The drawing is a vertical cross-section through a float chamber fitted with a float and valve embodying my invention.

Referring more particularly to the drawings, I show at 1 a float chamber having an outlet at 2 and a cap screwed thereon as at 3.

In the center of the bottom of chamber 1 is an opening 4 through which passes a valve seat member 5 threaded externally as at 6 to engage nut 8. A flange 7 is formed on member 5 to form a stop when the same is inserted in opening 4. When in position the nut 8 is threaded into position tightly against the bottom of the tank so that the member 5 is held rigidly in position therein.

Member 5 has a valve seat formed thereon at 9 communicating with a chamber formed within the upper part thereof as at 10. The floor 11 of this chamber slopes downwardly and away, from seat 9 to the outer wall 12 of the chamber which is pierced with angularly arranged orifices 13, the bottom of each orifice being a continuation of the floor 11 of chamber 10.

In the top of member 5 is formed a bearing surface 14 in axial alignment with seat 9.

At 15 I show a rod having a bearing 17 and a valve 18 mounted on the lower end thereof and preferably forming an integral part thereof, the former being adapted to engage surface 14 and the latter to engage valve seat 9. The bearing 17 is proportioned to pass freely through the constricted opening 16 of seat 9.

The float is shown at 19 having a tubular element 20 passing through its center and engaging rod 15. Float 19 is held in place on rod 15 by nut 21.

The rod 15 passes through an orifice 22 in the top of the float chamber, and in the present case is in contact with an operating arm 23 pivotally mounted at 24 and normally held in a raised position by spring 25. When arm 23 is operated by any suitable mechanism the rod 15 and parts carried thereby are forced downwardly a distance thereby allowing a sufficiently large volume of liquid to pass between the valve 18 and its seat 9 to wash out any obstruction that may have settled there and caused the valve to leak.

In this construction the top 3 may be removed and nut 8 unscrewed and the float and valve and all lifted together from chamber 1. Or, if desired, the nut 21 may be unscrewed and the valve 18, bearing 17 and stem 15 removed.

I claim:

A valve mechanism comprising an element having a flange formed thereon and externally threaded to receive a nut, and having a passage concentrically arranged therein and bevelled to form a valve seat, an annular upstanding wall arranged on said flange, and a top carried by said wall having a bearing surface formed therein in axial alignment with said passage, said wall having a plurality of orifices formed therein, and a valve stem carrying a bearing adapted to engage said bearing surface and having a float mounted thereon and supported by said bearing and carrying a valve adapted to engage said valve seat.

JOHN M. STONIER.